United States Patent [19]

Richardson

[11] 4,195,863
[45] Apr. 1, 1980

[54] VEHICLE SUSPENSION SYSTEM
[75] Inventor: George D. Richardson, Eastwood, Australia
[73] Assignee: Single Track Steer Pty. Limited, Mascot, Australia
[21] Appl. No.: 898,233
[22] Filed: Apr. 20, 1978
[51] Int. Cl.² .............................................. B60G 11/00
[52] U.S. Cl. .................................... 280/689; 280/718
[58] Field of Search ............... 280/105, 125, 680, 686, 280/699, 718, 113

[56] References Cited
U.S. PATENT DOCUMENTS

| | | | |
|---|---|---|---|
| 1,903,136 | 3/1933 | Reid | 280/689 |
| 3,494,629 | 2/1970 | Harbers | 280/125 |
| 3,515,405 | 6/1970 | Segar | 280/113 |
| 4,093,272 | 6/1978 | Raidel | 280/718 |

*Primary Examiner*—Philip Goodman
*Attorney, Agent, or Firm*—Geoffrey R. Myers

[57] ABSTRACT

Provided is an apparatus for mounting a wheel bearing axle suspension to a vehicle comprising a rigid sub-frame to which the wheel bearing axle suspension is attached, a runway on which the sub-frame may slide in a direction at right angles to the longitudinal axis of the axle, stop means which limit the distance of travel of the sub-frame on the runway, a horizontal turn-table bed plate to which the runway is attached, a horizontal turn-table top-plate fixedly attached to the vehicle and in which the bed plate may concentrically rotate, the stop means being such that when the vehicle is travelling forward, the sub-frame assumes a position in which the vertical plane which contains the longitudinal axis of the axle trails the vertical axis of the bed plate and top plate and is forward of the vertical axis when the vehicle travels in reverse.

9 Claims, 11 Drawing Figures

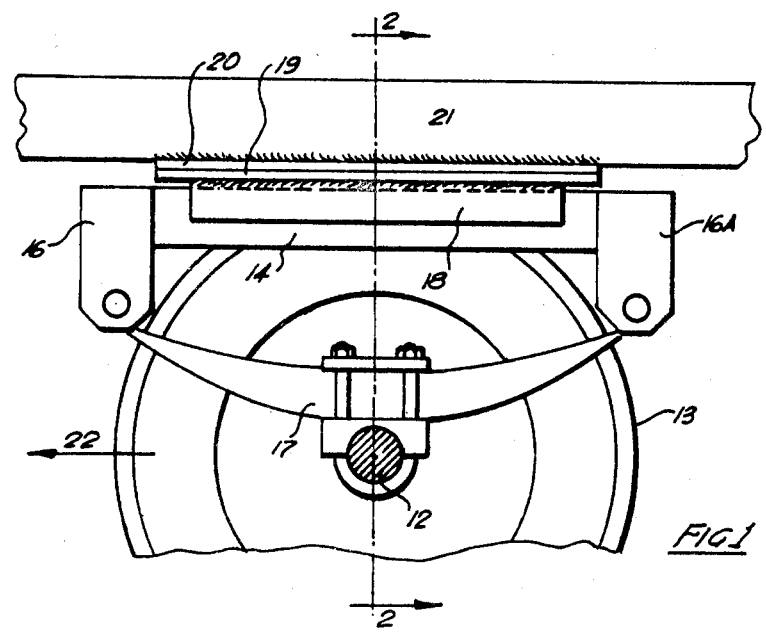
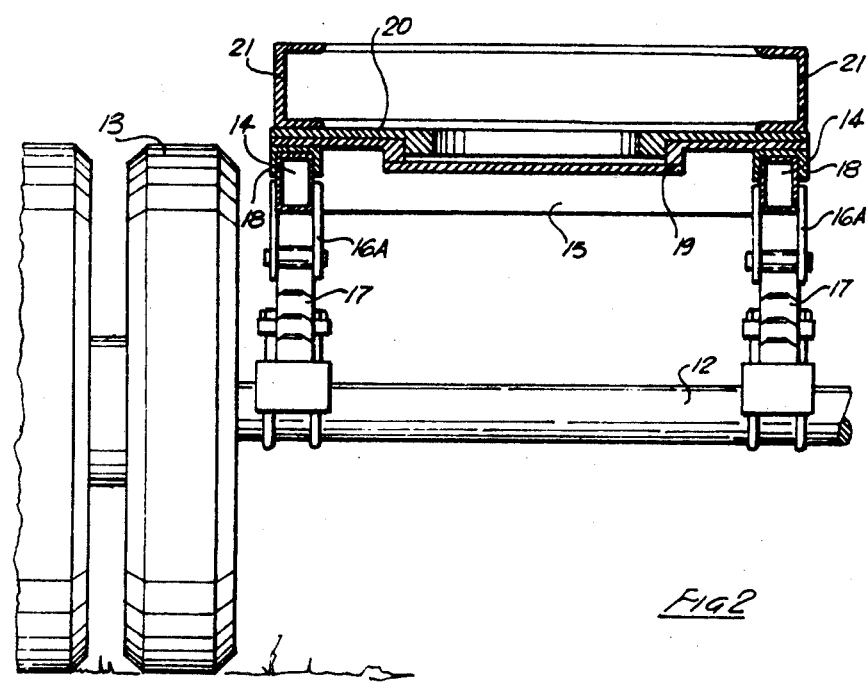

VEHICLE SUSPENSION SYSTEM

This invention relates to free-rolling wheel-units for vehicles; that is, those units consisting of an axle having a freely revolvable single or compound wheel on each of its ends; as distinct from those otherwise comparable wheel-units in which the wheels are power driven, or under directional control for steering purposes.

Almost invariably, the vehicles to which the present invention is applicable will be trailer or semi-trailer vehicles; and again, road vehicles rather than rail vehicles. However, although the invention is not restricted in its application to trailer or semi-trailer road vehicles, it will be described herein mainly in terms thereof since it is expected to be primarily useful in that particular connection.

Apart from their rotatability, and their freedom to rise in response to road surface irregularities and to descend by spring reaction, free-rolling wheels, as employed heretofore, are restrained against movement relative to the vehicle body. This is objectionable because non-rectilineal running of the vehicle causes the tires to scuff and hence become worn out earlier than would otherwise be the case.

The object of the present invention is to ameliorate the indicated disability in a simple way. This is carried out by the provision of a suspension system which endows a wheel-unit with a limited freedom for caster movement so that it becomes self-tracking or self-steering to a degree sufficient to avoid or substantially reduce scuffing action.

According to the present invention, suspension of a vehicle is in terms of one or more wheel-units which may be used singly or in groups provided (if desired) with load equalisation means as explained later herein.

The invention provides, mounting means for a vehicle wheel unit which includes an axle having a longitudinal axis and two freely revolvable wheels longitudinally spaced at respective ends of the axle, the mounting means comprising:
(a) a rigid sub-frame,
(b) suspension means for connecting the wheel unit to the sub-frame,
(c) runway means for permitting the subframe to slide in a direction at right angles to the longitudinal axis of the axle, and stop means associated therewith so located as to define two spaced limit positions for the sliding movement of said subframe,
(d) a horizontal turn-table bed-plate having said runway means fixedly attached to its underside, and
(e) a horizontal turn-table top plate fixedly secured to the underside of the vehicle structure and resting on said bed-plate, said bed plate being concentrically located and rotatable with respect to said top plate,
said runway means cooperating with the stop means such that when the vehicle travels in the forward direction, the sub-frame assumes one of the said limit positions in which the vertical plane that contains the longitudinal axis of the axle is spaced from and is trailing relationship to the common rotational vertical axis of the bedplate and the top plate, and when the vehicle is traveling in the reverse direction, the sub-frame assumes the other of the limit positions in which the vertical plane is oppositely spaced from and is trailing relationship to the said vertical axis.

Examples of the invention are illustrated in the drawings herewith wherein:

IN THE DRAWINGS

FIG. 1 is a side elevation of a wheel-unit and its suspension arrangements relative to a trailer vehicle.

FIG. 2 is a sectional end elevation taken on line 2—2 in FIG. 1.

FIGS. 1 and 2 provide a representation of the invention in its simplest form. The remaining figures of the drawings (FIGS. 3 to 11) are directed to practical and presently preferred embodiments of the invention.

Figure 3:
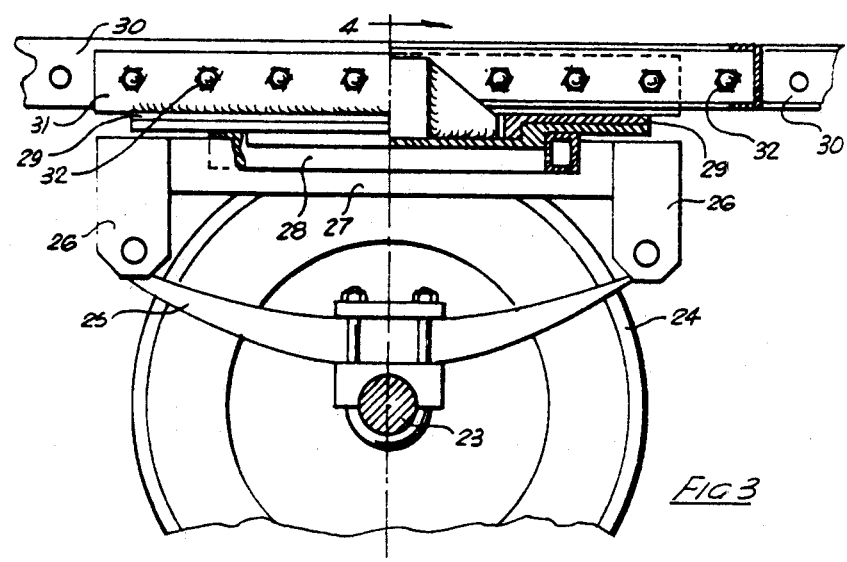

FIG. 3 is a partly-sectioned and incomplete side elevation of a wheel-unit and its suspension arrangements; these being substantially the same as those shown in FIGS. 1 and 2 except for a minor modification.

Figure 4:
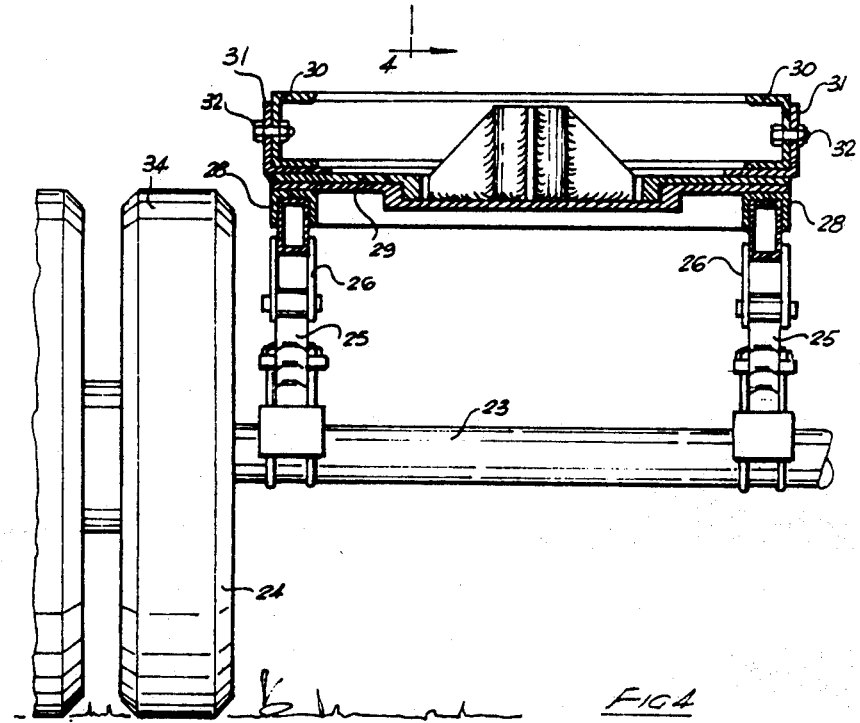

FIG. 4 is a sectional end elevation taken on line 4—4 in FIG. 3.

Figure 5:
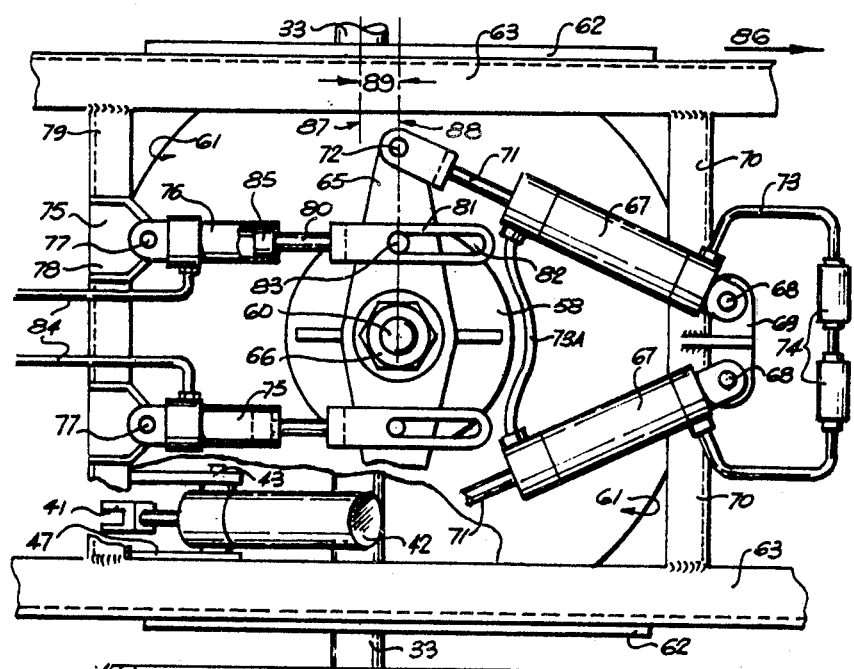

FIG. 5 is a plan partly showing a further modified arrangement.

Figure 6:
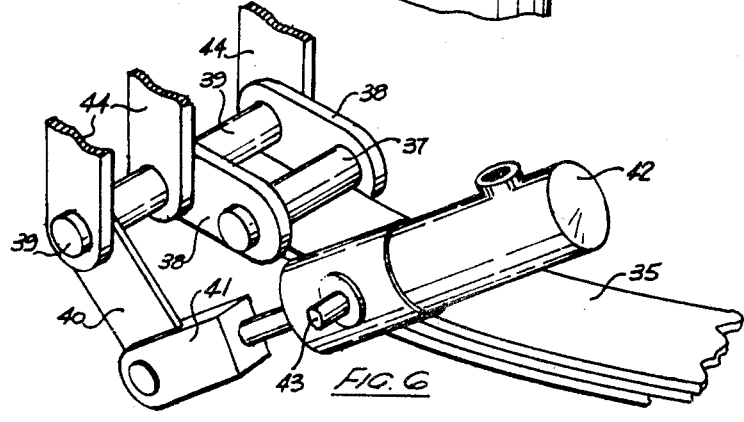

FIG. 6 is a perspective detail of some of the parts shown in FIG. 5.

Figure 7:
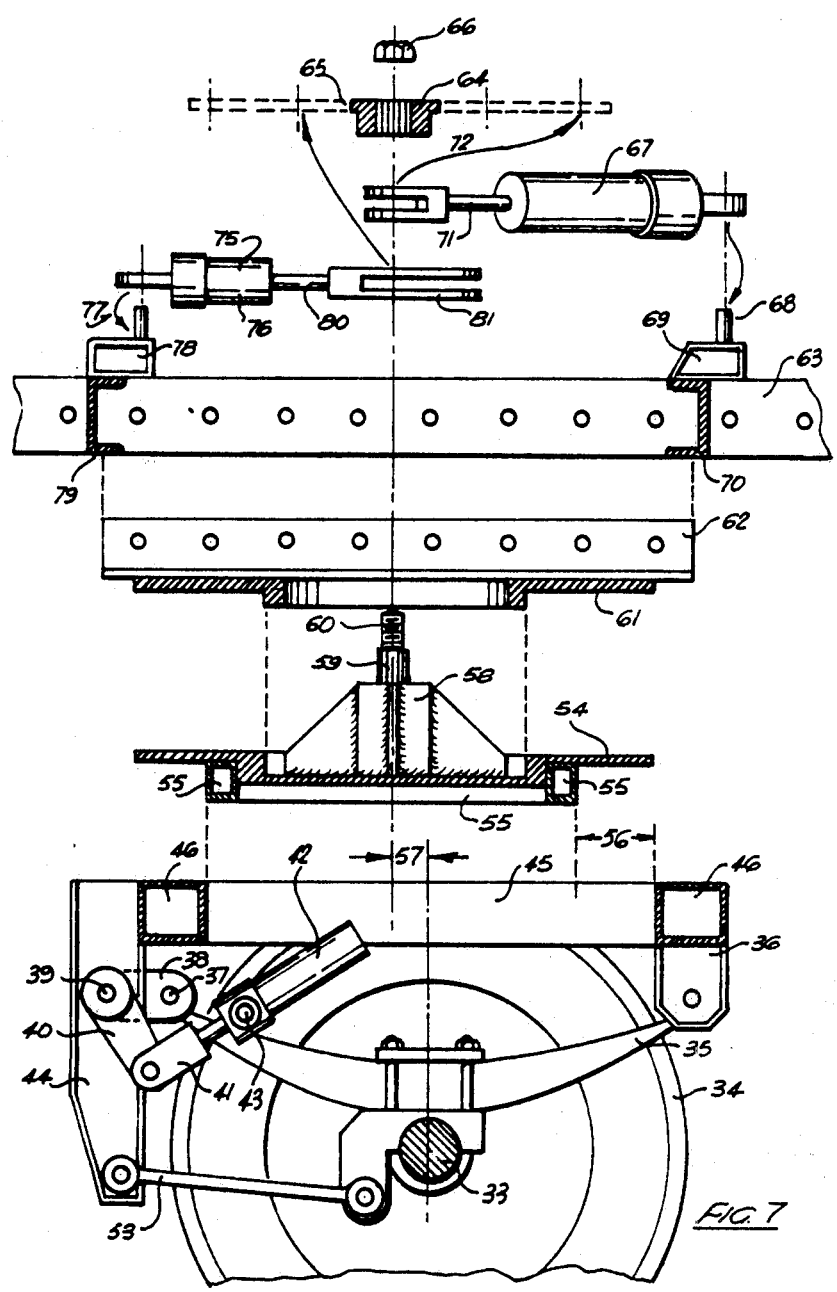

FIG. 7 is an exploded partly-sectioned side elevation of the embodiment aspects of which are already illustrated in FIGS. 5 and 6.

Figure 8:
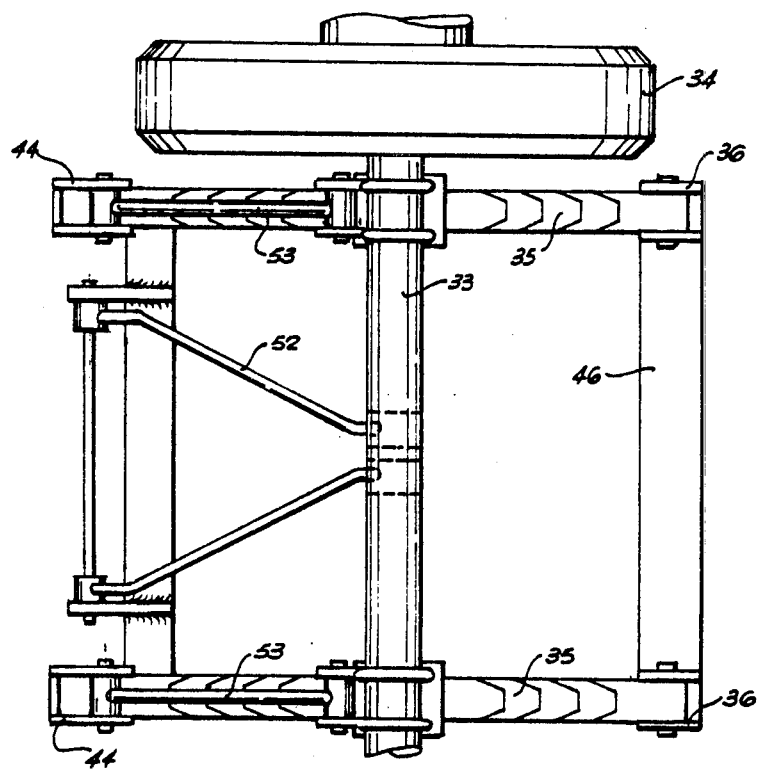

FIG. 8 is an incomplete inverted plan of the same embodiment.

Figure 9:
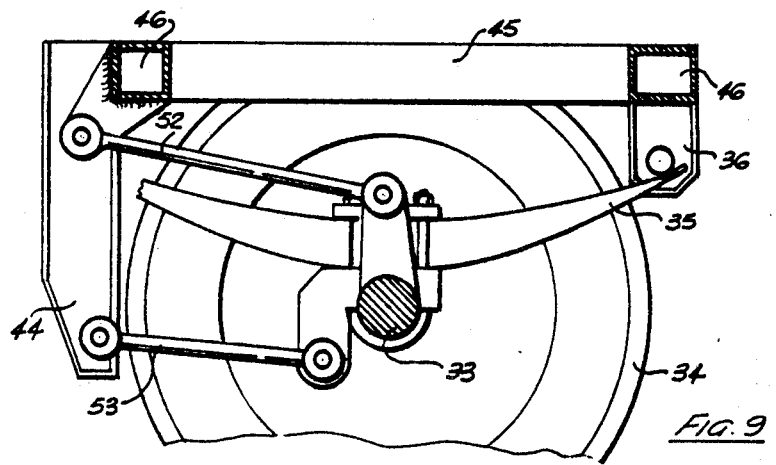

FIG. 9 is a side elevation projected from FIG. 8.

Figure 10:
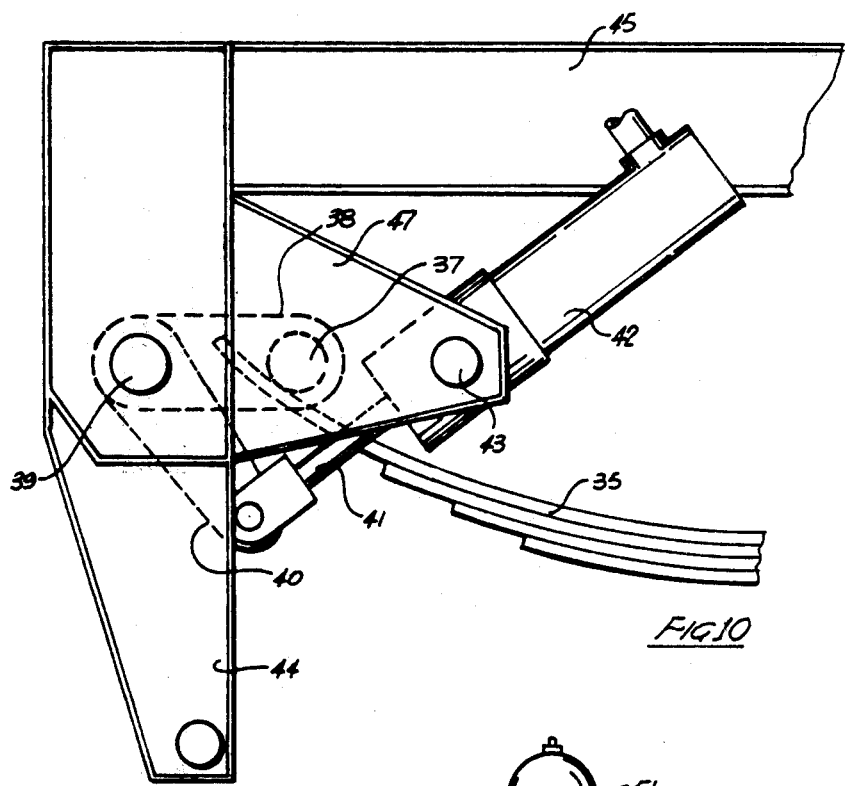

FIG. 10 is a detail virtually repeating part of FIG. 7 on an enlarged scale.

Figure 11:
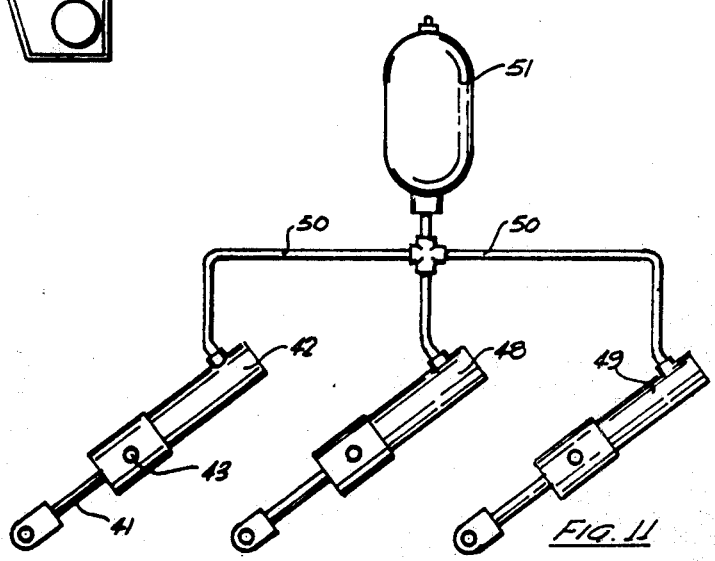

FIG. 11 is a diagrammatic showing of part of a wheel-unit load-equalisation arrangement.

Referring to FIGS. 1 and 2, a wheel-unit consists of axle 12 which at each end carries a freely revolvable wheel, or compound wheel, as indicated at 13.

A rigid rectangular sub-frame consists of longitudinal members 14 and transverse members 15. This frame carries suspension hangers 16 and 16A to which springs 17 are pivoted, slide-mounted or shackled as well understood. Axle 12 is bolted to the springs 17, also as well understood.

The sub-frame longitudinal members 14 (at right angles to the axis of axle 12) are longitudinally slidable in inverted channel runways 18 fixed on the underside of a turn-table bed-plate 19. A turn-table top-plate 20 is co-axial with and rotatable relative to bed-plate 19 and is fixed to the underside of the vehicle chassis members indicated at 21.

The illustrated turn-table arrangement is that commonly called a "greasy plate" turn-table. It will be understood that the turn-table may be of any other kind, for example, ball-race, roller-cone, oil-bath or other.

In FIG. 1 the wheel-unit is shown mid-way between those two limit positions in which it is able to move caster fashion about the turn-table vertical axis. When forward travel is commenced (in the direction indicated by arrow 22 in FIG. 1), the caster-mounted wheel-unit will tend to lag, or may be braked or spragged to lag, until the runways 18 assume the forward-running limit position in which they abut the stops constituted, in this instance, by the leading hangers 16. The vehicle then runs with the wheel-unit trailing to the full extent of caster throw permitted.

It will be clear that for most running, the wheel-unit will remain trailing by the limit amount of forward running caster throw relative to the vehicle body, but if the vehicle is about to be driven forwardly immediately following reverse driving thereof, in which the wheel-unit is in its reverse-running limit position with the stops 16A abutting the adjacent ends of runways 18, the wheel unit may have to be braked while the vehicle is driven forwardly so to ensure assumption of the required forward-running caster displacement of the wheel-unit in trailing relationship to the vehicle body.

When the vehicle is to be driven in reverse, the brakes of the wheel-unit are first applied and reverse driving of the vehicle is commenced until the runways 18 abut the hangers 16A, thus, then giving the wheel-unit the permissible maximum caster throw while the vehicle is being travelled in reverse.

In trailer vehicles which are to be heavily loaded, a plurality of caster-mounted wheel-unit assemblies as described above may be grouped together with no greater spacing between them than is necessary for running clearance. If desired, such a plural group of wheel-unit assemblies may include a number of conventional assemblies provided at least one of them is capable of caster movability as explained above.

Referring to FIGS. 3 and 4, an axle-unit consists of axle 23 and freely revolvable wheels 24. Axle 23 is bolted in conventional way to springs 25 and these in turn are mounted by way of hangers 26 in relation to a rigid sub-frame 27 longitudinally slidable in inverted channel runways 28 in substantially the same way as described above in relation to FIGS. 1 and 2. In this embodiment, the turn-table top-plate 29, instead of being fixed directly to the vehicle chassis members 30, is fixed to angle bearers 31 which in turn are bolted or otherwise secured to the chassis members 30 as indicated at 32. The provision of multibolting arrangements as indicated at 32 permits the position of the caster wheel-unit assembly to be placed longitudinally of the chassis members 30 in such position as may be selected to accommodate the loads to be carried by the vehicle. Moreover, the bolted attachment of the whole caster wheel-unit assembly enables that assembly to be readily removable from the vehicle in the event, for example, for the purposes of maintenance or repair.

It will be appreciated that in practical embodiments of the invention it is desirable to include a number of refinements reaching beyond the embodiments above described in terms of FIGS. 1 to 4 of the drawings. For example, it is desirable to include shock absorber means whereby the effect of a shock loading on the wheel-unit (due, for instance, to striking a road pot-hole which might produce an erratic change of the caster angle) is damped.

A second desirability is the provision of loading means which influence a caster-mounted wheel-unit to track at zero caster angle when the vehicle is running along a straight road. In this connection, it will be understood that in making a turn into a straight road and assuming the road is provided with abnormal camber, the angular caster displacement of the wheel-unit may tend to persist after the turn has finished and the vehicle is then following a straight course. Under these conditions persistence of caster angle displacement would be undesirable, as that, in itself, could be a source of tire scuffing.

A third desirable inclusion is the provision of load equalization means between companion wheel-units grouped in one and the same vehicle. The desirability of load equalisation, irrespective of whether the wheel-units are caster-mounted or conventionally mounted, is well recognised in the art, and the load equalization means which it is proposed to include, in combination, in practical embodiments of the present invention are substantially well-known.

The embodiment of the present invention shown by FIGS. 5 to 11 incorporate means furnishing the three desirable additional features just discussed.

Referring to FIGS. 5 to 11, a wheel-unit, as before, comprises axle 33 and freely revolvable wheels 34. Axle 33 is bolted in conventional manner to springs 35. Each of these springs is conventionally attached at one end to suspension hangers 36, the other ends of springs 35 bear against pins or rollers 37 on one arm 38 of a shackle in the form of a bell-crank fixed on shaft 39 having fixed to it the other arm 40 of the bell-crank which in turn is pivoted to the plunger rod 41 of a load equalizer hydraulic cylinder 42 conventionally mounted on trunnion pins 43. Shaft 39 is rotatably mounted on a hanger 44 fixed by its upper end to the rigid sub-frame composed of longitudinal members 45 and lateral members 46. The trunnion pins 43 are borne in cantilever brackets 47 (see FIG. 10) fixed to hangers 44.

Referring to FIG. 11, it will be seen that the equalizer cylinder 42 for the wheel-unit assembly shown in FIG. 7 (for example) is associated with the similar load equalization cylinders 48 and 49 of two other wheel-unit assemblies (not shown), and that these cylinders are connected together for load equalization purposes by a pipe system indicated at 50, this pipe system including a hydro-pneumatic accumulator 51 of known kind to cushion abrupt hydraulic pressure changes. The pipe system 50 is flexible and slack to allow for displacement of any of the wheel-units relative to the others.

The accumulator 51 is in the form of an oil reservoir permanently stocked with a supply of oil and having an air space bag above it for cushioning purposes. Such an air space bag constitutes a convenient way of pressurizing the hydraulic equalisation system pneumatically, All that is necessary in this regard is to connect the bag in the oil reservoir to a source of air under pressure and select the required equalization pressure by observation of the usual pressure gauge (not shown) provided on the reservoir.

It will be noticed, incidentally, that in the embodiment under discussion rising and falling movement of the wheel-unit relative to its sub-frame 45/46 is steadied and restrained, in known manner, by use of substantially parallel drag links 52 and 53.

Referring mainly to FIG. 7, the turn-table bed-plate 54 is fixed on a rectangular runway frame 55 which fits closely but slidably between the longitudinal members 45 and is movable between limit stops constituted by the lateral members 46. The full amount of this movability is equal to the span indicated at 56, being twice the maximum caster throw displacement indicated by span 57.

Bed-plate 54 has fixed to it a central pedestal 58 surmounted by a splined or otherwise keyed stub-shaft 59 and a threaded stud 60.

The turn-table top-plate 61 is fixed to the underside of a pair of angle bearers 62 selectively boltable to vehicle chassis longitudinal members 63.

The stub-shaft 59 receives the complementarily splined center-boss 64 of a tiller-bar 65, retained on the center-boss by nut 66 applied to stud 60.

The previously mentioned shock-absorber means consist of a pair of hydraulic cylinders 67 pivotally mounted at 68 on bracket 69 fixed on chassis lateral member 70. The free ends of the plunger rods 71 for these cylinders are pivoted to the respective ends of the tiller-bar 65 as indicated at 72. Cylinders 67 communicate, each with the other by way of pipe 73 and flexible balance pipe 73A. This pipe includes in it two oppositely set excess-flow check-valves 74. These valves are of known kind. They are also commonly known as velocity fuses or fluid circuit-breaker valves. In a hydraulic pipe-line such a valve permits a calibrated flow at all times. If flow through the pipe-line exceeds the preset valve the valve snap shut automatically, stopping further excess flow virtually instantaneously and completely; and remains closed until the excess pressure ceases. Normal flow in reverse direction through the valve is possible at all times. The effect of valves 74 in the instant case, is that hydraulic fluid will freely flow from one cylinder 67 to the other during part-rotation of tiller 65 due to normal caster-type movements of the associated wheel-unit. In the event of erratic shock-induced movement of the wheel unit one of the valves 67 will close so to restrain that movement.

The previously mentioned loading means consist of a pair of dashpot rams 75. Each of these rams comprises a cylinder 76 pivotally mounted by its outer end, at 77, to a bracket 78 on vehicle chassis lateral member 79; and a piston rod 80 carrying a clevis 81 having elongated lost-motion slots 82 by which the clevis engages a pin 83 on the tiller-bar 65. Each cylinder 76 is furnished with a working-fluid supply line 84 by which the cylinder may be pressurized to any selected loading thus to influence its piston 85 and hence its clevis 81 at all times to assume or remain in fully extended position (as shown in FIG. 5) relative to its cylinder 76.

Rams 75 may be hydraulic, in which case cylinders 76 may be pressurised by use of an accumulator such as that marked 51 in FIG. 11. Alternatively, cylinders 76 may be pneumatically charged; as a further alternative, pistons 85 could be loaded merely by compression springs housed in cylinders 76.

The operation of the loading rams 75 is best explained with reference to FIG. 5. In that figure the forward running direction of the vehicle is indicated by arrow 86; the caster throw (the distance by which the axle axis 87 lags behind the turn-table vertical axis in plane 88) is indicated by span 89; the wheel-unit is at its limit or maximum caster throw position and the caster displacement is 0°; that is, axis 87 and plane 88 are parallel.

Under these conditions, the vehicle is running forwardly and, for the time being, no caster action is taking place. The pistons 85, and hence the clevises 81, are fully extended and both in engagement respectively with pins 83, thus influencing the tiller-bar 64 to remain in its intermediate neutral position (as shown) corresponding to a caster displacement angle of 0°.

When caster displacement occurs, it takes place under opposition from only one of the two rams 75. The other of these rams is, for the moment, ineffectual because the related pin 83 simply moves freely within the slot 82, the active ram, under these circumstances, then continues to urge the tiller-bar to resume the neutral position as referred to above. Similarly, when the wheel unit is in the limit or maximum caster throw position for reverse running of the vehicle the same type of opposition to caster displacement takes place. The only difference is that, with reference again to FIG. 5, span 89 is now to the right of plane 88.

It will be understood that under certain circumstances (for example, extremely bad road conditions, or on long straight runs) it may be desirable to lock a wheel-unit against freedom for caster action, or possibly to lock the wheel-unit in some selected point within the full range of possible caster throw. The first of these locks may be accomplished simply by the provision of through-bolts extended through holes in the turn-table bed and top plates so locking those plates against relative rotatability.

Locking the wheel-unit at some selected point in the caster throw range may be similarly effected by bolting through the runway (such as 18 in FIG. 1) and that part of the sub-frame member (such as 14 in FIG. 1) lapped by the runway.

I claim:

1. Mounting means for a vehicle wheel-unit which includes an axle having a longitudinal axis and two freely revolvable wheels longitudinally spaced at respective ends of the axle, the mounting means comprising:
   (a) a rigid sub-frame,
   (b) suspension means for connecting the wheel unit to the sub-frame,
   (c) runway means for permitting the subframe to slide in a direction at right angles to the longitudinal axis of the axle, and stop means associated therewith so located as to define two spaced limit positions for the sliding movement of said subframe,
   (d) a horizontal turn-table bed-plate having said runway means fixedly attached to its underside, and
   (e) a horizontal turn-table top plate fixedly secured to the underside of the vehicle structure and resting on said bed-plate, said bed-plate being concentrically located and rotatable with respect to said top plate,
   said runway means cooperating with the stop means such that when the vehicle travels in the forward direction, the sub-frame assumes one of the said limit positions in which the vertical plane that contains the longitudinal axis of the axle is spaced from and in trailing relationship to the common rotational vertical axis of the bed-plate and the top plate, and when the vehicle is traveling in the reverse direction, the sub-frame assumes the other of the limit positions in which the vertical plane is oppositely spaced from and in trailing relationship to the said vertical axis.

2. Mounting means according to claim 1 wherein said turn-table top-plate is secured to the underside of the vehicle structure by way of bearers adapted to be fixed to said structure in selected longitudinal adjustment relative thereto.

3. Mounting means according to claim 1 or 2 wherein said suspension means include substantially parallel drag links connecting said wheel-unit to said sub-frame thereby to control movability of said wheel-unit relative to said sub-frame.

4. Mounting means according to claims 1 or 2 including loading means by which said wheel-unit is influenced to track at zero caster angle relative to the vehicle.

5. Mounting means according to claim 4 wherein said loading means comprise:
   (a) a tiller-bar which extends in the direction of the longitudinal axis of said axle, and is fixed relative to, said axis;
   (b) a pair of piston and cylinder dashpot rams pivotally connected to said vehicle structure and coupled to said tiller-bar by lost-motion devices; and
   (c) means for loading the pistons of said rams so to influence them to maintain said lost-motion devices fully extended relative to the cylinders of said rams.

6. Mounting means according to claims 1 or 2 including shock-absorber means by which shock-loadings imposed on said wheel-unit and tending to cause erratic change in the caster angle of that unit, are damped.

7. Mounting means according to claim 6 wherein said shock-absorber means comprise:
 (a) a pair of hydraulic cylinders each having a co-operative plunger rod;
 (b) means for pivotally connecting said cylinders and said plunger rods to and between the respective ends of said tiller-bar and to said vehicle structure;
 (c) a pipe through which the fluid-charged ends of said cylinders are in mutual communication; and,
 (d) a pair of oppositely-set, excess-flow check-valves inserted in said pipe.

8. Mounting means according to claims 1 or 2 wherein said vehicle has a plurality of said wheel-units and the said suspension means for at least one of said wheel units includes a load equalization means.

9. Mounting means according to claim 8 wherein said load equalization means comprise:
 (a) springs forming a part of said suspension means;
 (b) bell-crank shackles by which each of said springs has one end mounted on a related sub-frame;
 (c) a hydraulic equalizer cylinder having a plunger rod operatively coupled to a related one of said bell-crank shackles;
 (d) a flexible, slack pipe by which the equalizer cylinders of the grouped wheel-units are in mutual communication; and,
 (e) a hydro-pneumatic accumulator which communicates with said flexible, slack pipe.

* * * * *